United States Patent [19]

Fremerey et al.

[11] Patent Number: 4,620,752
[45] Date of Patent: Nov. 4, 1986

[54] MAGNETIC BEARING HAVING TRIAXIAL POSITION STABILIZATION

[75] Inventors: Johan K. Fremerey, Bonn; Albrecht Weller, Steinbach, both of Fed. Rep. of Germany

[73] Assignee: Kernforschungsanlage Jülich Gesellschaft mit beschränkter Haftung, Jülich, Fed. Rep. of Germany

[21] Appl. No.: 711,239

[22] Filed: Mar. 13, 1985

[30] Foreign Application Priority Data

Mar. 13, 1984 [DE] Fed. Rep. of Germany ....... 3409047

[51] Int. Cl.⁴ .............................................. F16C 39/06
[52] U.S. Cl. .................................................... 310/90.5
[58] Field of Search .......................................... 308/10

[56] References Cited

U.S. PATENT DOCUMENTS

| | | | |
|---|---|---|---|
| 3,698,775 | 10/1972 | Gilbert | 308/10 |
| 3,860,300 | 1/1975 | Lyman | 308/10 |
| 3,877,761 | 4/1975 | Boden | 308/10 |
| 3,890,019 | 6/1975 | Boden | 308/10 |
| 3,929,390 | 12/1975 | Simpson | 308/10 |
| 3,976,339 | 8/1976 | Sabnis | 308/10 |
| 4,077,678 | 3/1978 | Studer | 308/10 |
| 4,211,452 | 7/1980 | Poubeau | 308/10 |
| 4,268,095 | 5/1981 | Millner | 308/10 |
| 4,444,444 | 4/1984 | Benedetti | 308/10 |

FOREIGN PATENT DOCUMENTS 2444099 4/1976 Fed. Rep. of Germany .

OTHER PUBLICATIONS

*UHV Compatible Chopper System*, Donald E. Voss & Samuel A. Cohen, J. Vac. Sci. Technol., 1980, vol. 17, No. 1, p. 303 ff.

*Active Permanent Magnet Suspensions for Scientific Instruments*, Johan Fremerey & Karl Boden, J. Phys. E: Sci. Instrum., 1978, vol. 11, p. 106 ff.

*Spinning Rotor Vacuum Gauges*, Johan K. Fremerey, Vacuum, 1982, vol. 32, No 10/11, p. 685 ff.

*Design and Development of a Momentum Wheel with a Mainly Passive Magnetic Bearing*, Report ESA-CR (P)-696, MU-EX No. 47.055/75, p. 12.

*High Vacuum Gas Friction Manometer*, Johan K. Fremerey, J. Vac. Sci. Technol., 1972, vol. 9, No. 1, pp. 108 ff.

*A Magnetically Suspended Large Momentum Wheel*, Sabnis, Dendy, and Schmitt J. Spacecraft, Jul. 1975, col. 12, No. 7, pp. 420 ff.

Primary Examiner—R. Skudy
Attorney, Agent, or Firm—Nils H. Ljungman

[57] ABSTRACT

A magnetic bearing having contactless position stabilization of a supported body which includes a damping and aligning arrangement. This arrangement includes two spaced rotating annular permanent magnets which form a gap therebetween and which are attached to a rotor supported by the bearing. A stationary plate having good electrical conductivity and extending into the gap between the permanent magnets, is cut by their rotating magnetic flux. Mechanical disturbances of the rotor generate eddy-currents in the conductive plate which currents damp out these disturbances. A portion of the plate outside the gap is much thicker than the portion in the gap and provides a very low resistance path for the eddy-currents.

20 Claims, 3 Drawing Figures

MAGNETIC BEARING HAVING TRIAXIAL POSITION STABILIZATION

BACKGROUND OF THE INVENTION

1. Field of the Invention

The invention relates to magnetic bearings, and more particularly, to magnetic bearings for the triaxial position stabilization of bodies.

2. Description of the Prior Art

Magnetic bearings on opposite ends of a movable bearing part, typically have fixed bearing parts. Between the fixed bearing parts, a magnetic flux is maintained penetrating the movable bearing part in one direction. For the production of retaining forces parallel to the magnetic flux direction, electric coils are installed on the fixed bearing parts, which are controlled by a sensor system which measures the position of the movable bearing part in a contact-less manner to generate an error signal which then is fed to a servomechanism feedback circuit which adjusts the position of the movable bearing part.

Magnetic bearings of this type are known, for example U.S. Pat. No. 3,860,300 and German Patent No. DT-PS 24 44 099. Such bearings are used particularly for the axial stabilization of rotors in magnetic bearings. Refer, for example. to Voss-Cohen, "UHV compatible chopper system" in J. Vac. Sci. Technol., 1980, Vol. 17, No. 1, page 303 ff., and Fremerey/Boden "Active permanent magnet suspensions for scientific instruments" in J. Phys. E.: Sci. Instrum., 1978, Vol. 11, page 106 ff. The advantage of these known permanent magnetic rotor bearings resides in the fact that, for purposes of operating a contact-less bearing manner on all sides of the rotor, they required only a stabilization in the direction of the rotor axis. This advantage, however, is attained only at the expense of the disadvantage, also known, that such bearings exhibit practically no damping in the radial directions. The problems which result when critical rotor speeds are passed through can be countered, to a limited extent, with an increased expenditure, by careful balancing of the rotor system, as described by Voss/Cohen in their above-referenced publication. It is also known that additional electronic or mechanical damping devices can be used, to reduce the disruptive effect of vibrations on the rotor bearing. See Fremerey "Spinning rotor vacuum gauges" in Vacuum, 1982, Vol. 32, No. 10/11, page 685 ff. All the above-cited patents and publications are incorporated herein by reference.

For the stabilization of magnetic bearings, eddy-current damping devices are also used. Thus, in U.S. Pat. No. 3,929,390, the attachment of fixed copper discs to the end surfaces of permanent magnets fastened to rotating parts therein is proposed, to stabilize a bearing system. Such a damping apparatus has a low degree of efficiency in relation to the amount of permanent magnetic material used, because at the free ends of the permanent magnets, the magnetic field produced by the permanent magnets diverges strongly, and thus the magnetic field components, required for the desired radial eddy-current damping, have only a small penetration into the copper discs in the axial direction.

Significantly higher efficiencies are achieved by the installation of fixed copper discs in the field between two permanent magnets connected in series behind one another (See Report ESA-CR (P)-696, MU/EX No. 47.055/75, page 12, which is incorporated herein by reference. In this apparatus, the magnetic fields run inside the copper essentially in the axial direction, so that there is an optimal utilization of the field for the eddy-current damping of radial rotor movements. The effort and expense involved, however, are considerable. A total of 6 annular permanent magnets are required, 2 of which must also exhibit the radial magnetization direction, which is difficult to achieve from a manufacturing point of view. Considerably simpler, in the design configuration of its magnetic circuit regarding the efficiency achieved, is the radial eddy-current damping of a magnet system suspended on threads, described by Fremerey in "High vacuum gas friction manometer" in J. Vac. Sci. Technol., 1972, Vol. 9, No. 1, pp 108 ff which is incorporated herein by reference. Here, a fixed copper disc is penetrated by a magnetic field running axially between the end surface of a permanent magnet and a flat iron disc. On this apparatus, however, the coupling of the eddy-current damping apparatus to the body supported in a contact-less manner is very difficult and expensive. For this purpose, electronic amplifiers with multi-element sensor coils and electromagnetic deflection coils are necessary which are disposed in two directions independent of one another.

The last two devices described above, in addition to the indicated expense and complexity, have the disadvantage that they can only be used for radial damping. Further, they do not represent magnetic bearings.

In Sabnis, Dendy and Schmitt, "A Magnetically Suspended Large Momentum Wheel," J. Spacecraft, July 1975, Vol. 12, No. 7, pp. 420 ff., which is incorporated herein by reference, a three-loop magnetic bearing is shown where bias flux is provided by a stationary ring magnet. This flux is lead by the structure of the bearing across four axial gaps. Passive radial stiffness is provided through the action (minimum reluctance) of opposed concentric rings at their air gaps, the total stiffness being proportional to the number of rings. Radial damping is provided at least in part by conducting material, such as copper wire, placed in the inter-ring grooves at the air gaps. This bearing requires a complex, intricate and heavy ferromagnetic structure attached to the bearing shaft which is expense to manufacture. As the bearing gaps are formed between iron pole pieces, the bearing structure suffers a considerable unbalance stiffness along the axial direction. Further, the efficiency of the damping is rather low because of the limited amount of conducting material which can be placed in the relatively small inter-ring grooves.

The eddy-current damping apparatus described above according to U.S. patent application Ser. No. 3,929,390 uses, for damping, the permanent magnets of the radial bearing, but for the reasons mentioned above it has only a low degree of efficiency. The required magnetic bearing's axial bearing is located elsewhere.

OBJECT OF THE INVENTION

An object according to the invention is to create a magnetic bearing, of the simplest possible design, for the triaxial contact-less stabilization of the position of bodies with effective eddy-current damping, in which the flux of a single permanent magnetic circuit is used for the axial stabilization and simultaneously for the radial centering and damping.

SUMMARY OF THE INVENTION

The invention resides broadly in a magnetic bearing which has a movable part and means for supporting and maintaining said movable part in a bearing relationship with said means for supporting and maintaining, said magnetic bearing having an arrangement comprising: flux means for producing substantially constant, invariant flux, said flux means having means for attachment thereof to said movable means of said bearing; said flux means comprising at least two parts disposed along said movable means and being displaced one from the other; means, being electrically conductive and being non-ferromagnetic and non-magnetizable, for conducting currents generated therein by said flux of said flux means, said electrically conductive means comprising at least one rigid, substantially homogeneous, unitary element, only a sole element of said conductive means being disposed between any two of said at least two parts of said flux means, such that, a substantial portion of said flux of said flux means passes through at least a portion of said electrically conductive means; said electrically conductive means being disposed to be displaced from and in a non-contacting relationship with said movable means and said flux means; said electrically conductive means being disposed with respect to said movable means and said flux means, such as not to be movable with said movable means and said flux means; said flux means and said electrically conductive means being disposed so that said flux, produced by said flux means, forms a flux path, at least a portion of said flux path passing through and between said two of said at least two parts of said flux means, said portion of said flux path having substantially one substantially straight component disposed along solely one substantially single continuous direction and further having a substantially constant total flux along said portion of said flux path; and each element of said at least one element having a component being disposed perpendicular to said at least portion of said flux path passing through and between said at least two parts of said flux means.

Another aspect of the invention resides in a magnetic bearing of the type described above according to the invention having a movable bearing part which has at least two permanent magnetic regions in association therewith, which regions are separated from one another by a gap. The flux produced by and interlinking the two permanent magnetic regions extends through the gaps therebetween. The gap is preferably flat and extends in radial directions. The flux direction is preferably perpendicular to the radial directions. Projecting into the gap preferably in its radial directions is a plate of non-ferromagnetic and non-magnetizable material having a high electrical conductivity. The plate is fixed in place and does not come into contact with the movable bearing part.

A high magnetic flux with low stray flux fields is produced in the gap parallel to the axis of the rotating body of the permanent magnetic regions located abutting the gap.

The magnetic flux exiting through the pole surfaces penetrates the plate of non-magnetic material having high electrical conductivity located in the gap. Copper is preferably used as the plate material. If the movable bearing part is now moved parallel to the plate with its pole surfaces oriented parallel to the plate surface, then electrical voltages are induced in the plate with an orientation perpendicular to the direction of movement of the movable bearing part. The part of the plate which is inside the gap therefore becomes a voltage source, whereby the level of the induced voltage is proportional to the velocity of movement of the moving part of the bearing. The internal resistance of this voltage source is related to the cross-section and the thickness portion of the plate material penetrated by the permanent magnetic flux, and is also proportional to its electrical conductivity.

The damping of the movable bearing part is obtained as a result of the fact that the area, of the plate material of the electrical highly-conductive plate not penetrated by the magnetism, short-circuits the voltage source produced in the gap region, thus permitting a short-circuit current to flow. The loss energy thereby consumed is obtained from the movement energy of the moving bearing part. The plate thereby heats up, and the movement of the movable bearing part is damped.

To reudce the electrical resistance of the plate outside the area of the plate material penetrated by the magnetic flux, in another embodiment of the invention the plate material can be thicker outside the gap.

For bearing rotating bodies, a preferred embodiment of the magnetic bearing is described having the fixed bearing parts which are fastened to a hollow cylinder of material which has low reluctance and then is a good magnetic conductor. The hollow cylinder is used to carry the flux and also works as a magnetic shield for the magnetic bearing. The hollow cylinder shields the magnetic bearing on one hand against external interference fields, so that correct operation of the magnetic bearing is assured even in the vicinity of other electromagnetic equipment, for example, drive motors. Still further, the shielding also blocks magnetic interference from the magnet bearing itself upon neighboring equipment. In addition, the magnetic bearing with the hollow cylinder forms a quasi-closed unit, which is mechanically rugged and strong and also easy to handle.

The properties of the magnetic bearing can be applied to special advantage if the bearing is used for the stabilization of passive permanent magnet bearing systems. Such bearings, with rotationally-symmetric geometry exhibit in the direction of the bearing axis, properties resulting in a significant instability of forces. These unstable properties generate forces which push the supported rotating body to one side or the other out of its magnetic neutral position to the nearest axial mechanical stop. This instability is eliminated by the installation of the magnetic bearing arrangement described by the invention. The radially passive permanent magnetic bearing system can thus also be operated in the range of critical speeds, without the occurrence of interfering dynamic instabilities, for example, nutations. The farther the magnetic bearing is installed from the center of gravity of the rotating body, the better the damping action of the magnetic bearing, as far as rotational oscillations of the rotating shaft of the supported body around a quadrature axis are concerned. The magnetic bearing is preferably suited for the stabilization of bearing systems for flywheels. Moreover, a special advantage of its use as a suspension or support bearing for ultracentrifuges with a vertical axis of rotation and for turbomolecular pumps.

BRIEF DESCRIPTION OF THE DRAWINGS

The invention is explained in greater detail below the means of embodiments, which are schematically illustrated in the drawing.

DESCRIPTION OF THE PREFERRED EMBODIMENTS

Figure 1:
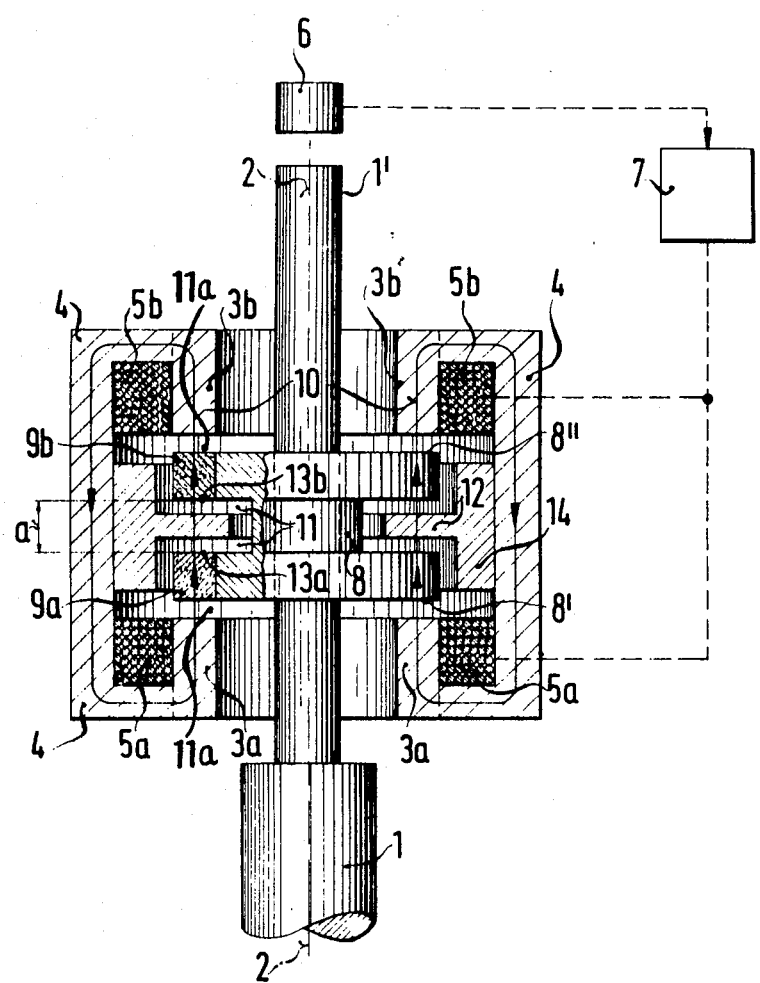
FIG. 1 shows a magnetic bearing for rotating bodies.

FIG. 1 shows a rotationally-symmetric magnetic bearing. The magnetic bearing serves as a suspension or support bearing for a shaft 1 of a body rotating around a vertical axis 2. The magnetic bearing exhibits fixed bearing parts 3a, 3b, which are components of a hollow cylinder 4 manufactured of a material which has a low reluctivity which is a good magnetic conductor, preferably iron. The fixed bearing parts 3a, 3b comprise a rotationally symmetrical stator. The ring shaped fixed bearing parts 3a, 3b are connected by the hollow cylinder 4. The rings are located in the embodiment at both ends of the hollow cylinder 4. Between the annular fixed bearing parts 3a, 3b and the hollow cylinder 4, there are electric coils 5a, 5b for the control of the magnetic bearing, whose current throughout is controlled by a sensor system 6 and an electronic regulator 7. The electrical connection lines are shown in the drawing in dotted lines. The sensor system 6 senses the position of the shaft 1 of the rotating body. A shaft part 1' penetrates the hollow cylinder 4 axially. On the shaft part 1' there is a movable bearing part 8, which rotates with the shaft 1 and thus forms the movable bearing part of the magnetic bearing. The movable bearing part 8 is located between the fixed bearing parts 3a, 3b whereby the opposite sides 8', 8" of the movable bearing part 8 are closely juxtaposed with the fixed bearing parts 3a, 3b forming a small gap 11A. Between the movable and fixed bearing parts, the magnetic flux runs parallel to the axis 2. The magnetic flux which toroidally surrounds the axis 2 is represented in FIG. 1 by a solid line penetrating the bearing parts shown in section.

The movable bearing part 8 exhibits two permanent magnetic regions 9a, 9b which are located at an axial distance from one another, and between which there is a gap 11 oriented perpendicular to the magnetic flux produced with the flux direction 10, which separates the permanent magnetic regions 9a, 9b from one another. An annular plate 12 projects into the gap 11, which is fixed in place and, in the embodiment, is fastened to the hollow cylinder 4. The plate 12 projects far enough into the gap 11 so that it is exposed to the magnetic field. The plate 12 comprises a non-magnetizable, non-ferromagnetic material of high electrical conductivity, preferably copper.

For the configuration of the permanent magnetic regions 9a, 9b, a rare earth cobalt alloy is preferably used as the permanent magnetic material on their pole surfaces 13a, 13b at the gap 11. This highly coercive material is magnetized parallel to the axis 2 and arranged so that the regions 9a, 9b are permanent magnets connected in series in a magnetically aiding relationship one behind the other to reinforce the action of their magnetic fields.

Together with the fixed bearing parts 3a, 3b which have opposite magnetic polarization, the result is thus a permanent magnetic flux in a specified direction through the low reluctance, magnetically high-conducting hollow cylinder 4. In FIG. 1, the flux direction 10 resulting in the embodiment is indicated by arrows. The fixed bearing part 3a thus represents a magnetic north pole, and the fixed bearing part 3b a magnetic south pole.

The magnetic fields produced by current flow and the annular electric coils 5a, 5b when there is a current flow in the coils, produce an axial force which, depending on the current direction in the coils, acts in one or the other direction axially on the movable bearing part 8 and thus on the shaft 1. The sensor system 6 produces electrical signals, which are proportional to the deviations of the shaft 1 from its specified axial position. The signals from the sensor system 6 are amplified by the electronic regulator 7 and determine the current direction and current magnitude in the coils 5a, 5b. The axial force thereby produced by means of the coils on the movable bearing part 8 counteracts the axial deviation of the shaft 1 from the specified position as measured by the sensor system 6. When the specified position is reached, no more current flows.

Between the pole surfaces 13, 13b of the permanent magnetic regions 9a, 9b, a large magnetic flux is produced. The magnetic flux, exiting through the pole surfaces 13a, 13b, penetrates in the flux direction 10 the plate 12 projecting into the gap 11, so that when there are radial movements of the shaft 1, a voltage is induced in the plate 12. The region of the plate 12 in the gap 11 therefore represents a voltage source, whereby the level of voltage induced is proportional to the radial movement velocity of the movable bearing part 8.

The portion of the plate 12 projecting out of the gap 11 is not affected by the magnetic flux. In this area, free of magnetic fields, no electrical voltage is induced. The voltage source produced within the gap 11 in the region of the plate 12 is short-circuited by this outer region of the plate 12. The energy loss dissipated in the short circuit is produced by the short-circuit current which flows due to the movement of the rotating body and thereby damps the latter, whereupon the plate 12 heats up. To create the least possible electrical resistance in the outside region of the plate 12 in the area free of a magnetic field, the plate 12 exhibits, in its area outside the gap 11, a thickening of the material 14, which is configured in the embodiment as annular collars extending above and below the plate 12, which are symmetrically disposed about the plane of the gap 11 and which thickening is wider than the gap 11. As a result of this thickening of the material 14, high short-circuit currents can flow in the plate 12, which in comparison to unthickened plates lead to significantly greater damping capacity at the same level of induced voltage.

The movable bearing part 8 can also have several permanent magnetic regions located at some distance from one another, with a plate projecting into each of the gaps being formed between the magnetic regions. The gaps alway run perpendicular to the magnetic flux, and are therefore arranged behind one another in the direction of axis 2 and parallel to one another. Such a configuration of the magnetic bearing increases the damping capacity.

In the embodiment, the permanent magnetic regions 9a, 9b of the movable bearing part 8 from annular permanent magnets, whereby a very high weight-specific magnetic moment is achieved for the movable bearing part 8. The weight load of the body rotating with the shaft 1 or of the rotor system is therefore light. The rotor system comprises a rotationally symmetrical rotor system. The arrangement, of the annular permanent magnets in the series connection, leads to an optimal efficiency for the coils 5a, 5b which correct the axial deviations of the shaft 1. The magnetic moment of the high-coercivity permanent magnetic material is such that it is not adversely affected by the magnetic fields of the coils 5a, 5b or by a magnetic field penetrating from outside into the bearing element. At the same time, the low magnetic conductivity, which characterizes the highly-coercive magnetic materials, guarantees in the direction of axis 2 of the rotating body a relatively low magnetic background instability of the movable bearing part 8 in the axial direction with respect to the fixed bearing parts 3a, 3b.

The hollow cylinder 4, made of a material which is a good magnetic conductor, forms a magnetic shield for the bearing element, which offers protection against external magnetic interference fields. In addition, the cylinder 4 also eliminates magnetic interference effects on neighboring equipment in the vicinity of the magnetic bearing as a result of the strong magnetic fields produced by the magnetic bearing itself.

Figure 2:
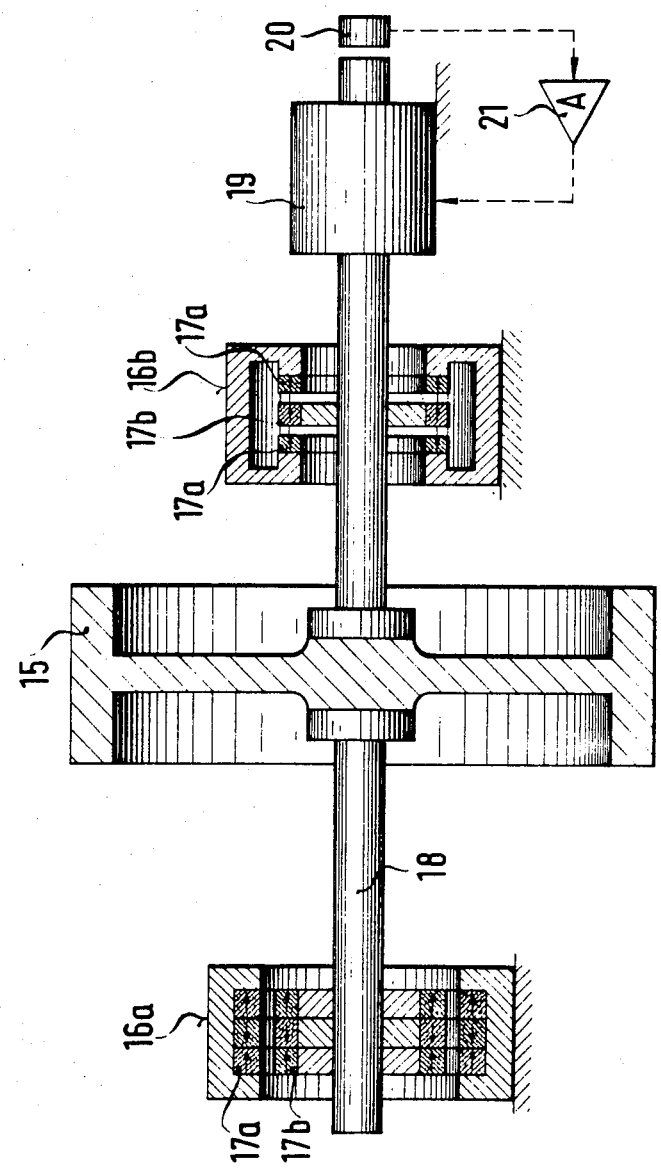
FIG. 2 shows a bearing system with a passive permanent magnetic radial bearing, which is stabilized by a magnetic bearing according to FIG. 1.

A special application of the magnetic bearing according to FIG. 1 is illustrated in FIG. 2. FIG. 2 shows a passive, permanent magnetic bearing system for a flywheel 15 with two passive, permanent magnetic radial bearings 16a, 16b which include, in a manner well known to the product, permanent magnets 17a, 17b with a radially repelling action as shown by the configuration of radial bearing 16a, or an axially attracting action as shown by the configuration of radial bearing 16b. In the embodiment, the permanent magnets 17a are fixed in position, and the permanent magnets 17b form movable bearing parts with the shaft 18 and the flywheel 15 as the rotor system. Such a magnetic bearing, when the rotor system is in its neutral position, exhibits a significant axial force instability, which pushes the rotor system out of the neutral position to one side or the other, for example, when the movable permanent magnets 17b in the axial direction of the shaft 18 assume a symmetrical position in relation to the fixed permanent magnets 17a. This instability is eliminated by a magnetic bearing 19, which is of the design illustrated in FIG. 1. The magnetic bearing 19 is controlled by a position sensor system 20 with amplifier 21 in the same manner as the magnetic bearing illustrated in FIG. 1. With the magnetic bearing 19, the rotor system with shaft 18 and flywheel 15 can now also be operated in the range of critical speeds, without dynamic instabilities such as nutations which occur and cause disturbances. The farther the magnetic bearing element 19 is installed from the center of gravity of the rotor system, the better the damping action of the magnetic bearing, as far as rotational oscillations of the shaft 18 around a quadrature axis are concerned. Of course, several magnetic bearings 19 can be used to increase the damping action.

The magnetic bearing described by the invention is therefore characterized by the following features:

The magnetic bearing contains a single, toroidally-closed permanent magnet circuit. The flux is shown in FIG. 1 by the solid lines with arrows indicating the direction 10 of the flux.

The axial contactless stabilization of the movable bearing part 8 between the fixed bearing parts 3a, 3b is achieved by means of coils 5a, 5b which are fed by the sensor system 6 and electronic regulator 7 with currents in opposite directions of rotation, as described in DE-PS No. 2 444 099, which is incorporated herein by reference. The direction and magnitude of these currents are determined by the output signal of the sensor system, which measures the axial position of the shaft 1 and therefore the position of the movable bearing part 8 in a contactless manner. The regulator 7 produces currents which are converted by means of the coils 5a, 5b in connection with the permanent magnetic regions 9a, 9b into retaining forces which act parallel to the flux direction 10, as soon as the movable bearing part 8 is moved from that axial position in which the output current of the regulator disappears. The regulator simultaneously produces damping forces, which independent of the current axial position, counteract all axial movements, especially axial oscillations of the movable bearing part 8.

The radial centering of the movable bearing part 8 in relation to the fixed bearing parts 3a, 3b is produced by a juxtaposition of pole surfaces 13a, 13b with the same shape as the permanent magnetic regions 9a, 9b and of magnetizable annular fixed bearing parts 3a, 3b which preferably comprise iron.

The radial damping is finally effected by the action of the plate 12 made of non-magnetizable and non-ferromagnetic material with high electrical conductivity, preferably copper, installed in a fixed manner between the permanent magnetic regions 9a, 9b of the movable bearing part 8. When there are radial movements of the bearing part 8, electrical voltages are induced in the areas of the plate 12 penetrated by the magnetic flux.

The magnetic bearing described by the invention therefore provides contact-free retaining, centering and damping forces in three axial directions independent of one another (one axial, two radial). It comprises, in the preferred embodiment, of two iron rings which form the fixed bearing parts 3a, 3b, of two annular permanent magnetic regions 9a, 9b for the movable bearing part 8, and of two electric coils 5a, 5b and an annular plate 12 of copper. All parts can be manufactured in a simple manner and can be installed easily.

Figure 3:
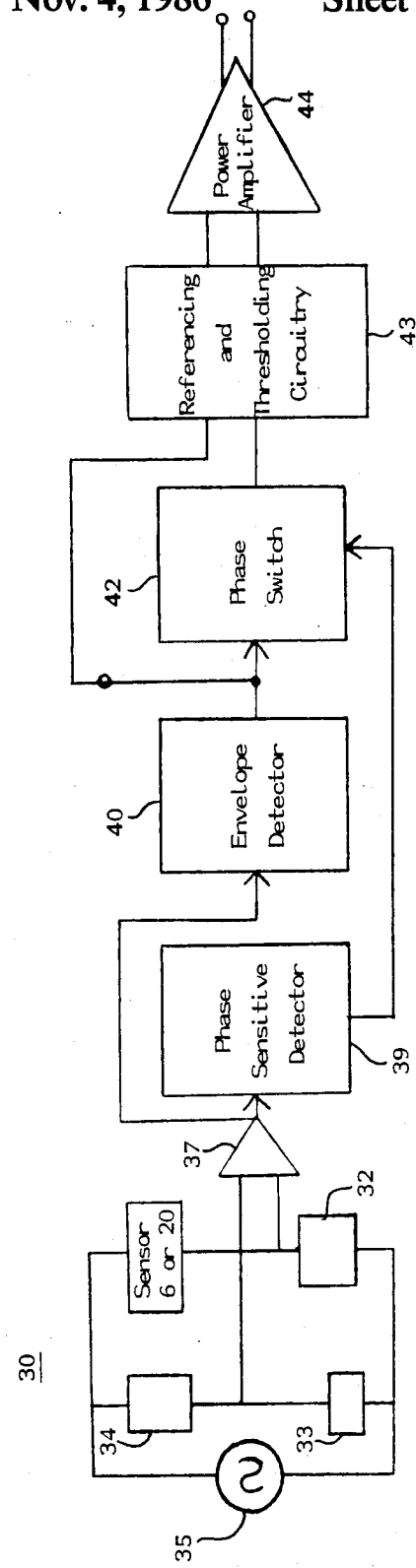
FIG. 3 shows a block diagram of a bridge circuit configuration for use with the magnetic bearings of FIGS. 1 and 2.

In FIG. 3 there is shown a well-known bridge circuit arrangement 30 for establishing a signal corresponding to the relative separation and/or movement between the shaft 1 and the sensor 6 (as shown in FIG. 1) or 20 (as shown in FIG. 2) as determined by changes in the capacitance of the sensor 6 or 20 which functions as a variable capacitor as the distance between the shaft 1 and the sensor 6 or 20 varies.

The sensor 6 (as shown in FIG. 1) or 20 (as shown in FIG. 2) in conjunction with an impedance element 32, preferably a capacitor, forms one-half of the bridge circuit 30. The capacitance magnitude of the capacitance sensor 6 or 20 changes in a relationship to the separation between the sensor 6 or 20 and the shaft 2. The magnitude of the impedance element 32 is selected in accordance with a desired separation therebetween. Adjustment of the impedance element 32 changes the desired position of the shaft 1. Two other impedance elements 33 and 34 form the other half of the bridge circuit 30. A signal source 35, which is preferably alternating current, is connected across the bridge circuit 30. The operation of such a bridge circuit 30 is well known in the electrical prior art. The output signal from the bridge circuit 30 is supplied to an amplifier 37 which outputs a signal in accordance with the separation and movement of the sensor 6 or 20 in reflection to the shaft 1, which output signal is fed back through connecting circuitry to the coils 5a, 5b in an appropriate manner, as indicated by the dotted lines in FIGS. 1 and 2, to correct excursions of the shaft 1 from its desired position.

The bridge circuit 30 through the amplifier 37 provides the signal to the connecting circuitry including a phase sensitive detector 39 which senses the movement of the shaft 1 relative to the sensor 6 or 20. The envelope detector 40 senses the magnitude of its input signal to provide an output signal in accordance with the distance of movement of shaft 1. A phase switch 42 provides an output signal in accordance with the magnitude and the direction of movement of the sensor 6 or 20. The signals from the envelope detector 40 and the phase switch 42 may be combined and/or thresholded and/or compared with reference signals in the referencing and thresholding circuitry 43, which circuitry when connected through to a power amplifier 44 generates output signals for connection to the electrical connections of the coils 5a, 5b. The power amplifier 44 preferably also includes an integrating circuit so that the error in the distance between the shaft 1 and the sensor 6 or 20 can be reduced to substantially zero.

The above circuit as shown in FIG. 3 is just one of many circuits which could be used for the control and regulation of the position of the shaft 1 in a magnetic bearing. Other circuits well known in the prior art could be substituted for this shown circuit.

The invention is not to be taken as limited to all the details that are described hereinabove, since modifications and variations thereof may be made without departing from the spirit or scope of the invention.

What is claimed is:

1. A magnetic bearing which has a movable means and means for supporting and maintaining said movable means in a bearing relationship with said means for supporting and maintaining, said magnetic bearing having an arrangement comprising:

flux means for producing substantially constant, invariant flux, said flux means having means for attachment thereof to said movable means of said bearing;

said flux means comprising at least two parts disposed along said movable means and being displaced one from the other;

means, being electrically conductive and being non-ferromagnetic and non-magnetizable, for conducting currents generated therein by said flux of said flux means, said electrically conductive means comprising at least one rigid, substantially homogeneous, unitary element, only a sole element of said conductive means being disposed between any two of said at least two parts of said flux means, such that, a substantial portion of said flux of said flux means passes through at least a portion of said electrically conductive means and said at least two parts of said flux producing means;

said electrically conductive means being disposed to be displaced from and in a non-contacting relationship with said movable means and said flux means;

said electrically conductive means being disposed with respect to said movable means and said flux means, such as not to be movable with said movable means and said flux means;

said flux means and said electrically conductive means being disposed so that said flux, produced by said flux means, forms a flux path, at least a portion of said flux path passing through and between said two of said at least two parts of said flux means, said portion of said flux path having substantially one substantially straight component disposed along solely one substantially single continuous direction and further having a substantially constant total flux along said portion of said flux path;

each element having a component being disposed perpendicular to said one straight component of said portion of said flux path passing through and between said at least two parts of said flux means;

electric control coils for controlling movement of said movable means substantially parallel to said portion of said one straight component to said portion of said flux path passing through and between said at least two parts of said flux means;

sensor means for sensing positions of said movable part;

electronic amplifier means for amplifying signals from said sensor means;

said sensor means having means for connection thereof to said electronic amplifier means; and said electronic amplifier means having means for being connected to said electric control coils for control thereof.

2. A magnetic bearing according to claim 1, wherein said electrically conductive means comprises a stationary plate affixed to a stationary part of said magnetic bearing.

3. A magnetic bearing according to claim 1, wherein each of said at least two parts of said flux means has a permanent magnet disposed therein for producing said flux.

4. A magnetic bearing according to claim 2, wherein each of said at least two parts of said flux means has a permanent magnet disposed therein for producing said flux.

5. A magnetic bearing according to claim 1, including ferromagnetic means disposed to form a low reluctance path for said flux of said flux means whereby stray flux fields are minimized.

6. A magnetic bearing according to claim 2, including ferromagnetic means disposed to form a low reluctance path for said flux of said flux means whereby stray flux fields are minimized.

7. A magnetic bearing according to claim 3, including ferromagnetic means disposed to form a low reluctance path for said flux of said flux means whereby stray flux fields are minimized.

8. A magnetic bearing according to claim 4, including ferromagnetic means disposed to form a low reluctance path for said flux of said flux means whereby stray flux fields are minimized.

9. A magnetic bearing according to claim 2, wherein said movable means comprises a rotationally symmetrical rotor having opposing faces and a longitudinal axis for rotation thereabout and wherein said substantially straight path of said flux is substantially parallel to said longitudinal axis of said rotor, and wherein said stationary plate has a portion being substantially annular and substantially flat with substantially parallel opposing flat surfaces, said opposing surfaces being substantially perpendicular to said substantially straight path of said flux where said flux extends through said at least two parts and said stationary plate, and said bearing having rotationally symmetrical stator means, said rotor being supported in use by said stator means.

10. A magnetic bearing according to claim 3, wherein said electrically conductive means comprises a stationary plate affixed to a stationary part of said magnetic bearing, and wherein said movable means comprises a rotationally symmetrical rotor having opposing faces and a longitudinal axis for rotation thereabout and wherein said substantially straight path of said flux is substantially parallel to said longitudinal axis of said rotor, and wherein said stationary plate has a portion being substantially annular and substantially flat with substantially parallel opposing flat surfaces, said opposing surfaces being substantially perpendicular to said substantially straight path of said flux where said flux extends through said at least two parts and said stationary plate, and said bearing having rotationally symmetrical stator means, said rotor being supported in use by said stator means.

11. A magnetic bearing according to claim 4, wherein said movable means comprises a rotationally symmetrical rotor having opposing faces and a longitudinal axis for rotation thereabout and wherein said substantially straight path of said flux is substantially parallel to said longitudinal axis of said rotor, and wherein said stationary plate has a portion being substantially annular and substantially flat with substantially parallel opposing flat surfaces, said opposing surfaces being substantially perpendicular to said substantially straight path of said flux where said flux extends through said at least two parts and said stationary plate, and said bearing having rotationally symmetrical stator means, said rotor being supported in use by said stator means.

12. A magnetic bearing according to claim 5, wherein said electrically conductive means comprises a stationary plate affixed to a stationary part of said magnetic bearing, and wherein said movable means comprises a rotationally symmetrical rotor having opposing faces and a longitudinal axis for rotation thereabout and wherein said substantially straight path of said flux is substantially parallel to said longitudinal axis of said rotor, and wherein said stationary plate has a portion being substantially annular and substantially flat with substantially parallel opposing flat surfaces, said opposing surfaces being substantially perpendicular to said substantially straight path of said flux where said flux extends through said at least two parts and said stationary plate, and said bearing having rotationally symmetrical stator means, said rotor being supported in use by said stator means.

13. A magnetic bearing according to claim 6, wherein said movable means comprises a rotationally symmetrical rotor having opposing faces and a longitudinal axis for rotation thereabout and wherein said substantially straight path of said flux is substantially parallel to said longitudinal axis of said rotor, and wherein said stationary plate has a portion being substantially annular and substantially flat with substantially parallel opposing flat surfaces, said opposing surfaces being substantially perpendicular to said substantially straight path of said flux where said flux extends through said at least two parts and said stationary plate, and said bearing having rotationally symmetrical stator means, said rotor being supported in use by said stator means.

14. A magnetic bearing according to claim 8, wherein said movable means comprises a rotationally symmetrical rotor having opposing faces and a longitudinal axis for rotation thereabout and wherein said substantially straight path of said flux is substantially parallel to said longitudinal axis of said rotor, and wherein said stationary plate has a portion being substantially annular and substantially flat with substantially parallel opposing flat surfaces, said opposing surfaces being substantially perpendicular to said substantially straight path of said flux where said flux extends through said at least two parts and said stationary plate, and said bearing having rotationally symmetrical stator means, said rotor being supported in use by said stator means.

15. A magnetic bearing according to claim 9 wherein said stationary plate has an outer periphery, and wherein said stationary plate includes an electrically conductive part along said periphery, said electrically conductive part being of the same material as the plate and having opposing surfaces being substantially further from one another than said opposing flat surfaces of said stationary plate.

16. A magnetic bearing according to claim 10 wherein said stationary plate has an outer periphery, and wherein said stationary plate includes an electrically conductive part along said periphery, said electrically conductive part being of the same material as the plate and having opposing surfaces being substantially further from one another than said opposing flat surfaces of said stationary plate.

17. A magnetic bearing according to claim 1, wherein said magnetic bearing comprises a passive permanent magnetic bearing system.

18. A magnetic bearing according to claim 2, wherein said magnetic bearing comprises a passive permanent magnetic bearing system.

19. A magnetic bearing according to claim 3, wherein said magnetic bearing comprises a passive permanent magnetic bearing system.

20. A magnetic bearing according to claim 16, wherein said magnetic bearing comprises a passive permanent magnetic bearing system.

* * * * *